United States Patent

Sonoda et al.

[11] Patent Number: 6,021,685
[45] Date of Patent: Feb. 8, 2000

[54] RACK-PINION TYPE POWER STEERING APPARATUS

[75] Inventors: Hirotetsu Sonoda; Tatsuya Fukushima, both of Higashimatsuyama, Japan

[73] Assignee: Jidosha Kiki Co., Ltd., Japan

[21] Appl. No.: 08/872,113

[22] Filed: Jun. 10, 1997

[51] Int. Cl.[7] .................................................. B62D 5/083
[52] U.S. Cl. .................................. 74/388 PS; 91/325 A; 180/417
[58] Field of Search ..................... 91/375 A; 74/388 PS, 74/498; 180/417, 428

[56] References Cited

U.S. PATENT DOCUMENTS

| | | | |
|---|---|---|---|
| 4,501,191 | 2/1985 | Webber et al. | 91/375 A |
| 4,621,703 | 11/1986 | Breitweg | 91/375 A X |
| 4,799,514 | 1/1989 | Tanaka et al. | 137/625.23 |
| 5,517,899 | 5/1996 | Bohner | 91/375 A |

FOREIGN PATENT DOCUMENTS

| | | |
|---|---|---|
| 0 059 657 A1 | 9/1982 | European Pat. Off. . |
| 0 082 027 | 6/1983 | European Pat. Off. . |
| 2 528 786 | 12/1983 | France . |
| 55-114763 UM | 8/1980 | Japan . |
| 55-114764 UM | 8/1980 | Japan . |
| 61-160362 | 7/1986 | Japan . |

*Primary Examiner*—Allan D. Herrmann
*Attorney, Agent, or Firm*—Townsend and Townsend and Crew LLP; Kenneth R. Allen

[57] ABSTRACT

A rack-pinion type power steering apparatus includes a cylindrical stub shaft, a torsion bar, a pinion shaft, a rotor, and a sleeve. The stub shaft rotates in a steering body upon a steering operation. The torsion bar has one end fixed at one end of the stub shaft and extends through the stub shaft toward the other end of the stub shaft. The pinion shaft is pivotally connected to the other end of the torsion bar. The rotor is arranged to cover the torsion bar from the stub shaft along an extending direction of the torsion bar. The sleeve has one end integrally connected to the pinion shaft, extends from the pinion shaft along the stub shaft, and is arranged around the rotor to constitute a rotary type channel selector valve between the rotor and the sleeve. The pinion shaft is axially supported by the steering body at two end portions of the sleeve.

8 Claims, 2 Drawing Sheets

RACK-PINION TYPE POWER STEERING APPARATUS

BACKGROUND OF THE INVENTION

The present invention relates to a rack-pinion type power steering apparatus and, more particularly, to the support structure of a pinion shaft integrally formed with a sleeve serving as the outer valve member of a rotary type channel selector valve (rotary valve).

A rack-pinion type power steering apparatus is advantageous in that it is lightweight, has a comparatively simple arrangement, is excellent in steering performance, and requires a small space when being incorporated in a vehicle, and is accordingly among those which are often employed as power steering. Although many apparatuses having various structures are conventionally proposed as such a rack-pinion type power steering apparatus, they still have room for improvement in achieving downsizing and weight reduction of an automobile and making the apparatus compact.

For example, each of Japanese Utility Model Laid-Open Nos. 55-114763 and 55-114764 discloses a structure in which a sleeve serving as an outer valve member constituting a rotary type channel selector valve is integrally formed on a pinion shaft having pinion teeth that mesh with the rack teeth of a rack in order to further decrease the size of the entire apparatus and to simplify the working and assembly operations.

In the former conventional case, a pinion shaft integrally having a sleeve is axially supported by a steering body with rolling bearings, e.g., a ball bearing and a needle bearing, formed on the two end portions of the pinion shaft. The valve housing portion can be integrally formed with the steering body.

In the latter conventional case, the two end portions of the pinion teeth of the pinion shaft are axially supported by a steering body with rolling bearings, e.g., a ball bearing and a needle bearing.

A conventional rack-pinion type power steering apparatus in which the pinion shaft and the sleeve serving as the outer valve member constituting the rotary type channel selector valve are integrally formed is known, as described above. In this conventional apparatus, however, when supporting the pinion shaft integrally formed with the sleeve, the two end portions of the pinion shaft including this sleeve in the steering body, or the two end portions of the pinion teeth of the pinion shaft are merely axially supported with the rolling bearings. With this arrangement, when a large load acts on the pinion shaft to deform it by bending, the sleeve serving as the outer valve member constituting the rotary type channel selector valve is also deformed by bending. Then, decentering, offset contact, and the like occur between the sleeve and the rotor serving as the inner valve member, thus interfering with a smooth valve action.

In particular, in this rotary type channel selector valve, the rotor integral with the stub shaft of the steering wheel and the sleeve integral with the pinion shaft of the steering wheel must be combined such that they can concentrically, rotatably displace relative to each other and be disposed in the valve housing. This is because the oil pump serving as the fluid pressure generating source, the oil tank, the inlet port and the return port communicating with the left and right cylinder chambers constituting the power cylinder, and the channels serving as the right and left output ports are connected to each other by selectively connecting and disconnecting a plurality of channel grooves radially formed in the outer circumferential portion of the rotor and the inner circumferential portion of the sleeve to and from each other by relative rotational displacement between the rotor and sleeve, thereby selecting the channels of the fluid-pressure circuit (hydraulic circuit).

In the conventional rack-pinion type power steering apparatus described above, when the sleeve is integrally formed on the pinion shaft, a smooth valve action is hindered due to the reason described above. A countermeasure that can solve this problem is therefore sought for.

SUMMARY OF THE INVENTION

The present invention has been made in view of the above situation, and has as its object to provide a rack-pinion type power steering apparatus in which when a sleeve constituting a rotary type channel selector valve is to be integrally formed on a pinion shaft, bending deformation that occurs when a load acts on the pinion shaft is prevented to obtain appropriate rotational displacement between the pinion shaft and the rotor so that the valve action becomes smooth, thereby obtaining a smooth steering feeling.

In order to achieve the above object, according to the present invention, there is provided a rack-pinion type power steering apparatus comprising a cylindrical stub shaft which rotates in a steering body upon a steering operation, a torsion bar having one end fixed at one end of the stub shaft and extending through the stub shaft toward the other end of the stub shaft, a pinion shaft pivotally connected to the other end of the torsion bar, a rotor arranged to cover the torsion bar from the stub shaft along an extending direction of the torsion bar, and a sleeve having one end integrally connected to the pinion shaft, extending from the pinion shaft along the stub shaft, and arranged around the rotor to constitute a rotary type channel selector valve between the rotor and the sleeve, wherein the pinion shaft is axially supported by the steering body at two end portions of the sleeve.

DESCRIPTION OF THE PREFERRED EMBODIMENTS

First Embodiment

Figure 1:
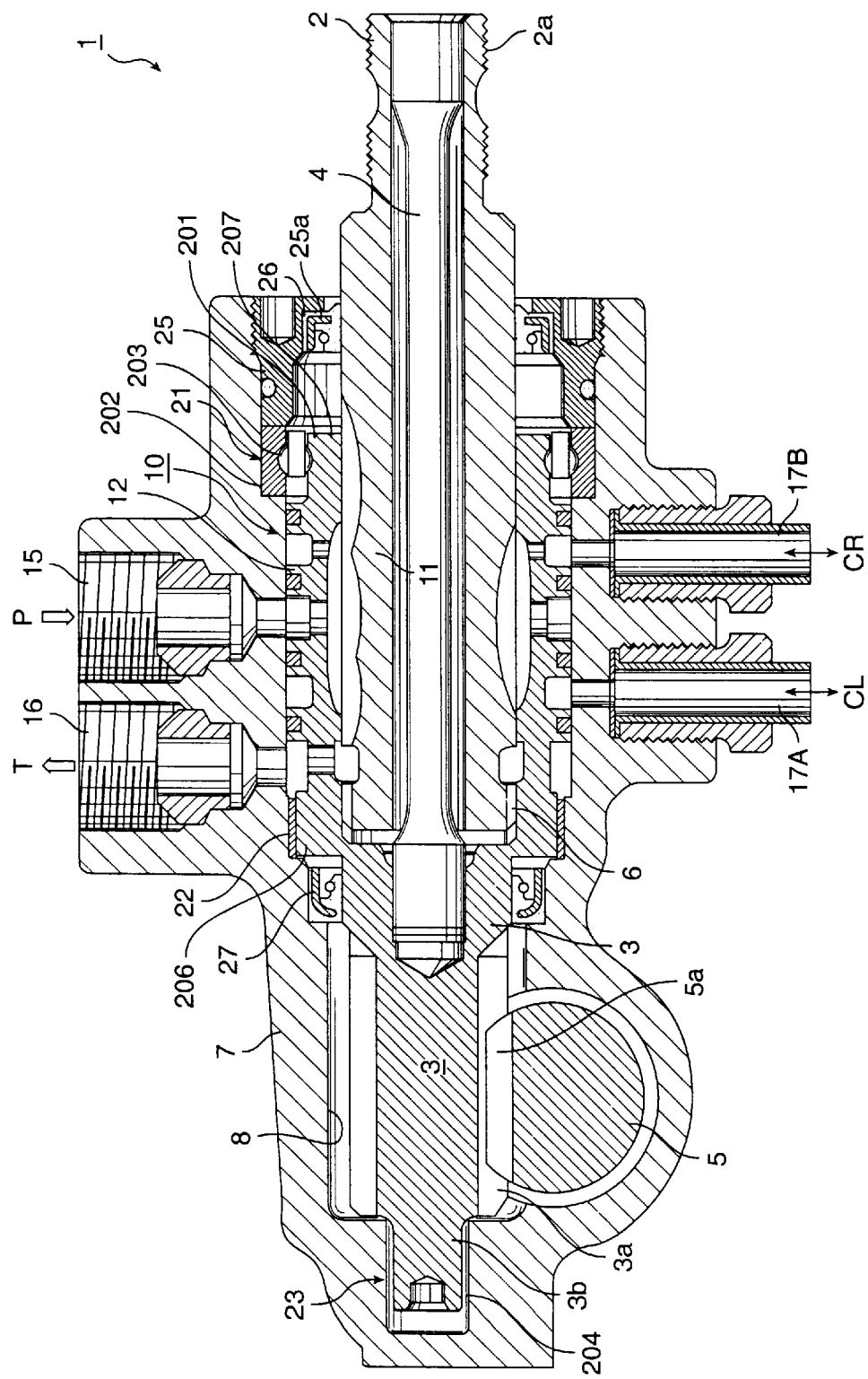
FIG. 1 is a sectional view of an apparatus main body portion showing a rack-pinion type power steering apparatus according to an embodiment of the present invention.

FIG. 1 shows a rack-pinion type power steering apparatus according to an embodiment of the present invention. In FIG. 1, reference numeral 1 denotes the power steering main body portion of the rack-pinion type power steering apparatus; 2, a cylindrical stub shaft serving as an input shaft connected to a steering wheel (not shown); 3, a pinion shaft; and 4, a torsion bar having one end fixed to one end of the stub shaft 2, extending toward the other end (to the left in FIG. 1) of the stub shaft 2, and connected to the pinion shaft 3 at its other end (inner end). A cylindrical rotor 11 is arranged to cover the torsion bar 4 along the extending direction of the torsion bar 4. Since the rotor 11 is integrally formed with the stub shaft 2, the rotor 11 is integrally connected to the stub shaft 2. A sleeve 12 is arranged around the rotor 11. The sleeve 12 has one end integrally formed with the pinion shaft 3 so that it is integrally connected to the pinion shaft 3. A rotary type channel selector valve 10 is formed between the rotor 11 and the sleeve 12. Pinion teeth 3a that mesh with rack teeth 5a on a rack 5 constituting a steering link mechanism (not shown) are formed on the pinion shaft 3.

Between the outer circumferential end of the rotor 11 away from the stub shaft 2 and the inner wall of the sleeve 12 near a portion integrally connected to the pinion shaft 3, a safety spline portion 6 constituted by projecting portions and groove portions is arranged as a fail safe mechanism that allows relative rotational displacement within a predetermined angular range caused by the torsion of the torsion bar 4.

The torsion bar 4 has the inner end pressed into and fixed with the pinion shaft 3 and an outer end extending through the stub shaft 2 to the outer end (right end) of the stub shaft 2. The stub shaft 2 is integrally connected to the torsion bar 4 at its serrated portion 2a to be coupled to the stub shaft 2 on the steering wheel side, through a welding means by, e.g., welding the entire circumferential portion of the serrated portion 2a to the torsion bar 4. Conventionally, this portion is connected by driving a connection pin. In contrast to this, when connection is performed by welding the entire circumferential portion of the serrated portion 2a in this manner, hole formation and pin driving become unnecessary, and moreover an O-ring serving as a seal member also becomes unnecessary.

Reference numeral 7 denotes a steering body constituting the power steering main body portion. The steering body 7 is constituted by an integral structure serving also as a valve housing for the rotary type channel selector valve 10 (to be described later).

The stub shaft 2 and the pinion shaft 3 are rotatably supported by axial support portions where they are directly received by bearings (to be described later) and the steering body 7. Oil seals are interposed at appropriate positions of the stub shaft 2 and the pinion shaft 3.

In an incorporating space 8 in the steering body 7, the rotor 11 connected to the stub shaft 2 and constituting the rotary type channel selector valve 10, and the sleeve 12 integrally connected to one end of the pinion shaft 3 are arranged on the same axis so as to oppose each other. Channel selection between an oil pump P or an oil tank T (neither are shown) and left and right cylinder chambers CL and CR of the power cylinder is performed by relative rotational displacement (torsion of the torsion bar 4) of the rotor 11 and the sleeve 12, as is known widely. In order to perform this channel selecting operation, a plurality of channel grooves are formed at predetermined intervals in the radial direction as valve grooves in the outer and inner circumferential surfaces, respectively, of the rotor 11 and the sleeve 12 that oppose and are in slidable contact with each other. A plurality of fluid supply holes and fluid discharge holes are formed in appropriate portions of the outer and inner circumferential surfaces, respectively, of the rotor 11 and the sleeve 12 by boring. When these channel grooves and the like are selectively connected and disconnected, the hydraulic circuit is selectively controlled as required.

In FIG. 1, reference numeral 15 denotes an inlet port through which the hydraulic oil flows from the oil pump P; 16, a return port 16 through which the hydraulic oil returns to the oil tank T; and 17A and 17B, left and right output ports connected to the left and right cylinder chambers CL and CR, respectively, of the power cylinder. When the rotary type channel selector valve 10 (described above) rotationally displaces upon the steering operation, the hydraulic channels among these ports are arbitrarily connected and disconnected, thereby controlling generation of an auxiliary steering force in the power cylinder (not shown), as is known widely.

According to the present invention, the sleeve 12 constituting the rotary type channel selector valve 10 is integrally formed on the pinion shaft 3. The pinion shaft 3 is axially supported by the steering body 7 at the two end portions of the sleeve 12 connected to the pinion shaft 3 through a ball bearing (rolling bearing) 21 and a bush 22.

According to the present invention, a small-diameter distal end portion 3b of the pinion shaft 3 is axially supported by an axial support portion 23 which is a recess formed in the steering body 7. The bearing gap 204 between the axial support portion 23 and the pinion shaft 3 is within the allowable bending stress of the pinion shaft 3 and slightly larger than the bearing gap between the pinion shaft 3 and the axial support portions constituted by the ball bearing 21 and the bush 22 at the two end portions of the sleeve 12.

The ball bearing 21 described above is integral with the pinion shaft 3, has an inner ring 201 constituted by a small-diameter portion 207 formed at the end portion of the sleeve 12 away from the pinion shaft 3, and is constituted by a combination of a ball 203 and an outer ring 202. In FIG. 1, reference numeral 25 denotes a plug member incorporated in the steering body 7 to engage with the open end (on the stub shaft 2 side) of the incorporating space 8. The inner end of the plug member 25 abuts against the outer ring of the ball bearing 21, so that it is locked between the ball bearing 21 and the stepped portion of the steering body The plug member 25 is formed with an opening that holds the rotor 11 integral with the stub shaft 2 while the rotor 11 extends through the opening. A holding groove 25a for holding an oil seal 26 is formed in this opening portion. The rotor 11 integrally formed with the stub shaft 2 is pivotally inserted into the steering body 7 through the oil seal 26, and is sealed by the oil seal 26. Another oil seal 27 is disposed also at a portion of the sleeve 12 integrally formed on the pinion shaft 3 nearer the pinion teeth 3a than the bush 22. A working fluid is filled between the oil seals 26 and 27. Since the bush 22 for supporting one end of the rotor 11 is arranged in this working fluid, it has excellent bearing performance and excellent durability.

With the arrangement described above, since the pinion shaft 3 is axially supported by the steering body 7 through the axial support portions (21, 22) at the two end portions of the sleeve 12 which pose the serious problem in the valve action, deformation of the sleeve 12 at these portions is small and the valve action is smooth, thereby obtaining a smooth steering feeling. In particular, even if a light load such as a bending force acts on the pinion shaft 3, no bending deformation occurs in the sleeve 12, and the valve action of the rotary type channel selector valve 10 for obtaining an auxiliary steering force can be performed smoothly.

With the arrangement described above, even if a large load acts on the pinion teeth 3a of the pinion shaft 3, an influence on the sleeve 12 can be reduced, and the valve action at the sleeve 12 can be performed smoothly regardless of whether the load acts on the pinion teeth 3a.

Since the sleeve 12 constituting the rotary type channel selector valve 10 is integrally formed on the pinion shaft 3, the number of constituent components is small, and the number of portions to be worked is small, so that working and assembly operations are facilitated and the structure becomes simple. With this arrangement, a backlash that poses a problem during operation does not occur between the pinion shaft 3 and the sleeve 12, and the rigidity becomes excellent. Furthermore, in the conventional general apparatus structure, the sleeve 12 and the pinion shaft 3 are formed as separate members. When the sleeve 12 and the pinion shaft 3 are connected to each other through a connecting portion, the size of the sleeve 12 and the pinion shaft 3 as a whole increases in the radial direction due to the presence of the connecting portion. Since the valve housing portion is formed separately from the steering body 7, the number of components increases, and the working and assembly operations become cumbersome. However, with the arrangement described above, these problems do not occur.

In particular, since the incorporating space 8 in the steering body 7 where the pinion shaft 3 and the stub shaft 2 are incorporated can be formed to open only on the stub shaft 2 side and such that its diameter decreases stepwise toward its distal end, its inner diameter can be worked by one-directional boring. Also, the assembly operation can be performed easily by incorporating, mounting, and pressing the pinion shaft 3 and the stub shaft 2 from one direction. Therefore, automatic assembly is possible.

In this embodiment, since the sleeve 12 is integrally formed on the pinion shaft 3 and the sleeve 12 is formed to have substantially the same diameter as that of the large-diameter portion 206 of the pinion shaft 3, the steering body 7 and the valve body can be integrally formed, and a reduction in size can be achieved. With this straight structure constituted by the pinion shaft 3 and the sleeve 12, the rotor 11 to be incorporated in this straight structure can be formed straight to have the same diameter as that of the stub shaft 2, thereby improving the workability of the stub shaft 2.

As described above, since the distal end portion 3b of the pinion shaft 3 is axially supported by the axial support portion 23 having a bearing gap 204 slightly larger than that of the axial support portions (21, 22) described above, a large support strength can be maintained over the entire pinion shaft 3, and no problem occurs in the durability.

In particular, in this arrangement, the pinion shaft 3 integrally formed with the sleeve 12 is supported at three apparent points, i.e., the two axial support portions (21, 22) at the two ends of the sleeve 12 and the axial support portion 23 of the distal end portion 3b of the pinion shaft 3. In practice, however, when, for example, the acting load is small, the pinion shaft 3 is supported at two points, i.e., at the two ends of the sleeve 12. Therefore, the valve action in travel particularly along an almost straight road can be performed smoothly.

Since the bearing gap 204 of the axial support portion 23 at the distal end portion 3b of the pinion shaft 3 is large and the degree of freedom in elasticity at the pinion teeth 3a is large, when the pinion teeth 3a mesh with the rack teeth 5a, even if the gear working precision is poor, this poor working precision can be absorbed. Since the rack teeth 5a and the pinion teeth 3a can mesh smoothly, a smooth steering feeling can be obtained. Since the meshing gap occurring due to the gear precision is not backlash among the constituent components, knocking does not occur in steering and kicking back.

Since the axial support portion 23 at the distal end portion 3b of the pinion shaft 3 functions only when a large load acts, which does not much influence the steering feeling, even if the pinion shaft 3 is received not by a comparatively expensive needle bearing but directly by a bush 22 or the steering body 7, the steering feeling does not suffer.

In the embodiment described above, since the incorporating space 8 is formed by boring the steering body 7 from one side, the concentricity of the members incorporated in it can be maintained, and these members can be assembled easily. Furthermore, in this embodiment, the rotor 11 is axially supported on the inner circumferential portion of the sleeve 12 of the pinion shaft 3 to be integral with the stub shaft 2 through direct axial support of the steering body 7. While the concentricity of the rotor 11 and the sleeve 12 is maintained by this direct axial support, the rotor 11 and the sleeve 12 can be pivotally supported by the steering body 7.

In this case, the slidable contact surface of either the rotor 11 or sleeve 12 may be subjected to friction decreasing treatment. As such friction decreasing treatment, for example, manganese phosphate treatment, gas soft nitriding treatment, Teflon dispersion type electroless nickel-phosphorus composite plating, molybdenum disulfide baking, Teflon coating, and plasma-CVD ceramic-based hard film treatment are possible, and either one of them may be performed.

In particular, such rotor 11 and sleeve 12 pivot relative to each other only through a small angle. If the rotor 11 or the sleeve 12 is subjected to the surface treatment as described above, the apparatus becomes advantageous in terms of cost when compared to a case wherein a separate bearing is arranged.

Second Embodiment

Figure 2:
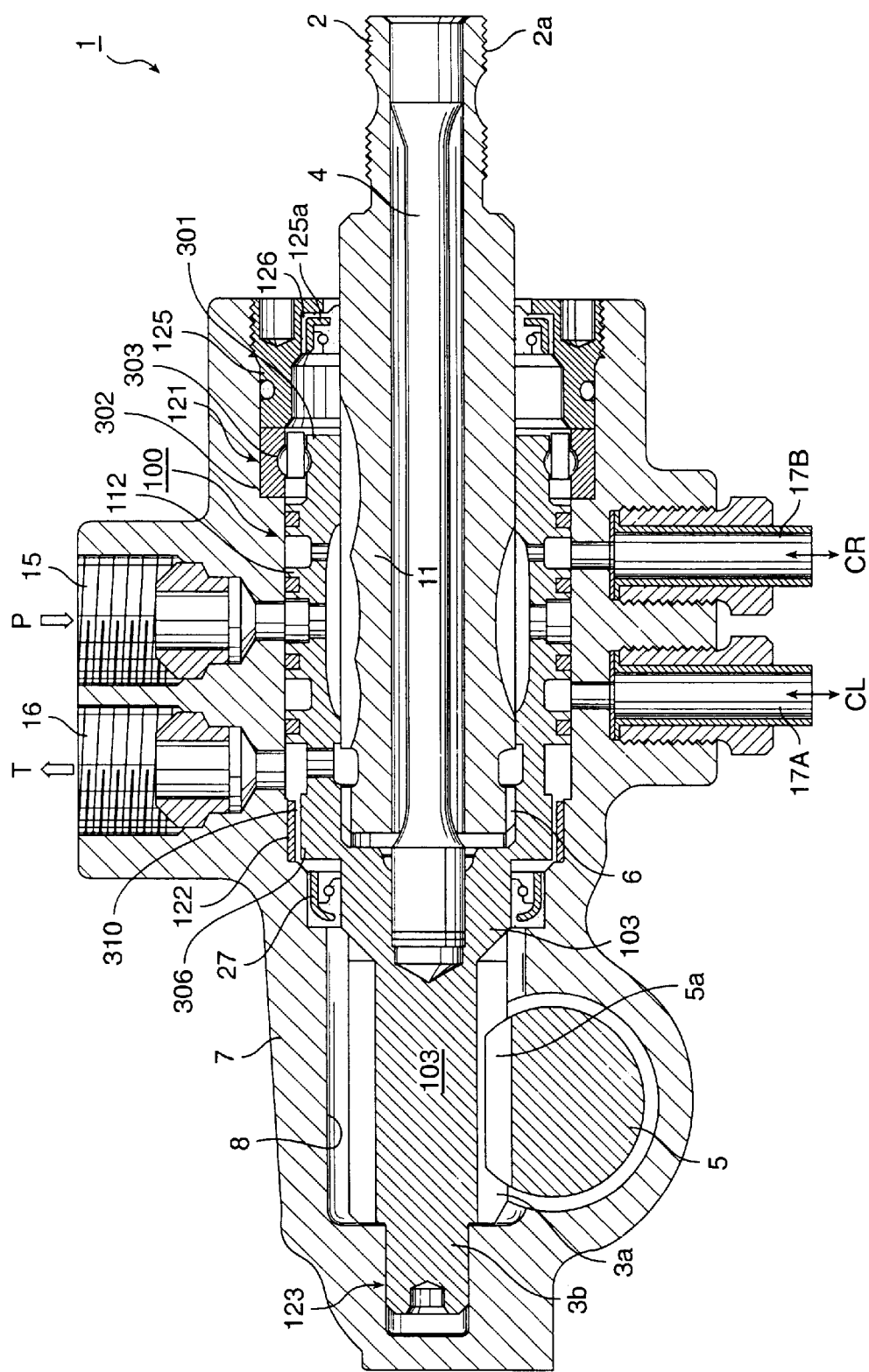
FIG. 2 is a sectional view of an apparatus main body portion showing a rack-pinion type power steering apparatus according to another embodiment of the present invention.

FIG. 2 shows a rack-pinion type power steering apparatus according to another embodiment of the present invention. In FIG. 2, members equivalent to those in FIG. 1 are denoted by the same reference numerals as in FIG. 1.

According to the second embodiment shown in FIG. 2, a sleeve 112 constituting a rotary type channel selector valve 100 is integrally formed on a pinion shaft 103, and is axially supported by a steering body 7 at the two end portions of the integral structure constituted by the pinion shaft 103 and the sleeve 112, i.e., axial support portions 121 and 123 formed on the distal end portion of the pinion shaft 103 away from the sleeve 112 and the end portion of the sleeve 112 away from the pinion shaft 103. The intermediate portion of the integral structure constituted by the pinion shaft 103 and the sleeve 112 is axially supported by the steering body 7 through an axial support portion 122 having a bearing gap 310 which is different from that of the axial support portion 121 or 123. The axial support portion 121 is formed as a sliding bearing with a ball bearing. The axial support portion 123 is formed as a sliding bearing as it is directly received by the steering body 7. The axial support portion 122 is formed as a sliding bearing with a bush. The ball bearing described above that forms the axial support portion 121 has an inner ring 301 constituted by a small-diameter portion formed at the end portion of the sleeve 112 integral with the pinion shaft 103, and is constituted by a combination of a ball 203 and an outer ring 302.

According to this embodiment, the intermediate portion of the pinion shaft 103 is axially supported by the steering body 7 at the axial support portion 122 having a bearing gap 310 which is within the allowable bending stress of the pinion shaft 103 and slightly larger than the bearing gap 310 between the pinion shaft 103 and other axial support portions 121 and 123 formed at the two ends of this integral structure.

In FIG. 2, reference numeral 125 denotes a plug member incorporated in the steering body 7 to engage with the open end of an incorporating space 8. The inner end of the plug member 125 abuts against the outer ring 302 of a ball bearing 121, so that it is locked between the ball bearing 121 and the stepped portion of the steering body 7.

The plug member 125 is formed with an opening that holds a stub shaft 2 while the stub shaft 2 extends through the opening. A holding groove 125a for holding an oil seal 126 is formed in the plug member 125. The stub shaft 2 is pivotally inserted into the steering body 7 through the oil seal 126, and is sealed by the oil seal 126. Another oil seal 127 is disposed also at a portion of the pinion shaft 103 nearer pinion teeth 3a than a bush 122. A working fluid is filled between the oil seals 126 and 127.

Since the bush 122 is located in this working fluid, it has an excellent bearing performance and an excellent durability.

With the arrangement described above, since the pinion shaft 103 is axially supported by the steering body 7 through the axial support portions (121, 123) at the two end portions of the integral structure constituted by the sleeve 112 and the pinion shaft 103 which pose the serious problem in the valve action, bending deformation particularly in the sleeve 112 is small and the valve action is smooth, thereby obtaining a smooth steering feeling. In particular, even if a light load such as a bending force acts on the pinion shaft 103, only small bending deformation occurs in the sleeve 112, and the valve action of the rotary type channel selector valve 100 for obtaining an auxiliary steering force can be performed smoothly.

With the arrangement described above, even if a large load acts on the pinion teeth 3a of the pinion shaft 103, an influence on the sleeve 112 can be reduced by the axial support portion 122 at the intermediate portion, and the valve action at the sleeve 112 can be performed smoothly regardless of whether the load acts on the pinion teeth 3a.

Since the sleeve 112 constituting the rotary type channel selector valve 100 is integrally formed on the pinion shaft 103, the number of constituent components is small, and the number of portions to be worked is small, so that working and assembly operations are facilitated and the structure becomes simple. With this arrangement, backlash that poses a problem during operation does not occur between the pinion shaft 103 and the sleeve 112, and the rigidity becomes excellent. Furthermore, in the conventional general apparatus structure, for example, when the sleeve 112 is formed as a separate member and is connected to the pinion shaft 103, the size of the sleeve 112 and the pinion shaft 103 as a whole increases in the radial direction due to the presence of the connecting portion. Since the valve housing portion is formed separately from the steering body 7, the number of components increases, and the working and assembly operations become cumbersome. However, with the arrangement described above, these problems do not occur.

In particular, since the incorporating space 8 in the steering body 7 where the pinion shaft 103 and the stub shaft 2 are incorporated can be formed to open only on the stub shaft 2 side and such that its diameter decreases stepwise toward its distal end, its inner diameter can be worked by one-directional boring. Also, the assembly operation can be performed easily by incorporating, mounting, and pressing the pinion shaft 103 and the stub shaft 2 from one direction. Therefore, automatic assembly is possible.

In this embodiment, since the sleeve 112 is integrally formed on the pinion shaft 103 and the sleeve 112 is formed to have the same diameter as that of the large-diameter portion 306 of the pinion shaft 103, the steering body 7 and the valve body can be integrally formed, and a reduction in size can be achieved. With this straight structure constituted by the pinion shaft 103 and the sleeve 112, a rotor 11 to be incorporated in this straight structure can be formed straight to have the same diameter as that of the stub shaft 2, thereby improving the workability of the stub shaft 2.

As described above, since the intermediate portion of the integral structure constituted by the pinion shaft 103 and the sleeve 112 is axially supported by the axial support portion 122 having a bearing gap 310 slightly larger than that of the axial support portions (121, 122) described above, a large support strength can be maintained over the entire pinion shaft 103, and no problem occurs in the durability. In particular, in this arrangement, the pinion shaft 103 integrally formed with the sleeve 112 is supported at three apparent points, i.e., the two axial support portions (121, 123) at the two ends of the sleeve 112 and the axial support portion 122 at the intermediate portion of the pinion shaft 103. In practice, however, when, for example, the acting load is small, the pinion shaft 103 is supported at two points, i.e., at the two ends of the sleeve 112. Therefore, the valve action in travel particularly along an almost straight road can be performed smoothly.

Since the axial support portion 122 at the intermediate portion of the pinion shaft 103 functions only when a large load acts, which does not much influence the steering feeling, even if the pinion shaft 103 is received not by a comparatively expensive needle bearing but directly by a bush 122 or the steering body 7, the steering feeling does not suffer.

In the embodiment described above, since the incorporating space 8 is formed by boring the steering body 7 from one side, the concentricity of the members incorporated in it can be maintained, and these members can be assembled easily. Furthermore, in this embodiment, the rotor 11 is axially supported on the inner circumferential portion of the sleeve 112 of the pinion shaft 103 to be integral with the stub shaft 2 through direct axial support. While the concentricity of the rotor 11 and the sleeve 112 is maintained by this direct axial support, the rotor 11 and the sleeve 112 can be pivotally supported by the steering body 7.

In this case, the slidable contact surface of either the rotor 11 or sleeve 112 may be subjected to friction decreasing treatment. As such friction decreasing treatment, for example, manganese phosphate treatment, gas soft nitriding treatment, Teflon dispersion type electroless nickel-phosphorus composite plating, molybdenum disulfide baking, Teflon coating, and plasma-CVD ceramic-based hard film treatment are possible, and either one of them may be performed.

In particular, such rotor 11 and sleeve 112 pivot relative to each other only through a small angle. If the rotor 11 or the sleeve 112 is subjected to the surface treatment as described above, the apparatus becomes advantageous in terms of cost when compared to a case wherein a separate bearing is arranged.

The present invention is not limited to the structures described in the above embodiments, but the shape, structure, and the like of the respective portions of the power steering main body portion 1 of the rack-pinion type power steering apparatus can be modified and changed as required, as a matter of course. More specifically, in the embodiments described above, the rack-pinion type power steering apparatus is entirely examined, and the structure is simplified, the workability and the assembly are facilitated, and the cost is reduced. However, the present invention is not limited to this.

For example, the structure or the support structure of the stub shaft 2 and the rotor 11 constituting the rotary type channel selector valve 10 or 100, the shape and structure of the valve grooves and the fluid pressure channels of the rotary type channel selector valve 10 or 100 constituted by the rotor 11 and the sleeve 12, the rack 5, the support structure of the rack 5, and the like may be changed as required.

The ball bearing 21 or 121 using the sleeve 12 or 112 as the inner ring constitutes the axial support portion at the end portion of the sleeve 12 or 112 on the steering wheel side of the pinion shaft 3 or 103. However, the present invention is not limited to this, and a ball bearing whose inner ring is integrally fixed on the sleeve by a locking means, e.g., a snap ring, may be used.

The axial support portion at the axial center located on the sleeve 12 or 112 of the pinion shaft 3 or 103 on the pinion teeth 3a side is not limited to the bush 22 or 122, but may employ a bearing structure in which this axial center is directly received by a needle bearing or the steering body 7.

The axial support portion 23 or 123 nearer the distal end portion 3b of the pinion shaft 3 or 103 than the pinion teeth 3a constitutes a bearing structure directly received by the body 7. However, this portion may constitute a bearing structure employing a bush or a needle bearing.

The distal end portion 3b located on the distal end side more than the pinion teeth 3a of the pinion shaft 3 or 103 may be formed with, e.g., a straight shape, a tapered shape in which the distal end is slightly so thin as to avoid striking of the distal end edge, or a curved shape in which the central portion is slightly thick.

As has been described above, in the rack-pinion type power steering apparatus according to the present invention, the sleeve constituting the rotary type channel selector valve is formed integrally on the pinion shaft, and this pinion shaft is axially supported by the steering body at the two end portions of the sleeve through bearings, e.g., a ball bearing, a bush, or a needle bearing. Alternatively, the sleeve constituting the rotary type channel selector valve is formed integrally on the pinion shaft, the sleeve is axially supported by the steering body through bearing portions formed at two end portions of the pinion shaft, and the intermediate portion of the pinion shaft is axially supported by the steering body through an axial support portion having a bearing gap which is different from that of the bearing portions. Therefore, although the apparatus has a simple arrangement, it has excellent effects as follows.

According to the present invention, since the pinion shaft is axially supported by the steering body through the axial support portions at the two end portions of the sleeve which pose the serious problem in the valve action, deformation of the sleeve is small and the valve action is smooth, thereby obtaining a smooth steering feeling. In particular, even if a light load such as a bending force acts on the pinion shaft, no deformation occurs in the sleeve, and the valve action of the rotary type channel selector valve for obtaining a steering auxiliary force can be performed smoothly.

According to the present invention, since the sleeve constituting the rotary type channel selector valve is integrally formed on the pinion shaft, the number of constituent components is small, and working and assembly operations are facilitated and the structure becomes simple. According to the present invention, for example, when forming the sleeve as a separate member and connecting it to the pinion shaft, the entire size increases in the radial direction due to the presence of the connecting portion. Since the valve housing portion is formed separately from the steering body, the number of components increases, and the working and assembly operations become cumbersome. However, according to the present invention, these problems do not occur.

In particular, according to the present invention, since the incorporating space in the steering body where the pinion shaft and the stub shaft are incorporated can be formed to open only on the stub shaft side and such that its diameter decreases stepwise toward its distal end, its inner diameter can be worked by one-directional boring. Also, the incorporating operation can also be performed easily from one direction. Therefore, automatic assembly is possible.

According to the first embodiment of the present invention, since the distal end portion of the pinion shaft is axially supported by the steering body through the axial support portion having a bearing gap which is within the allowable bending stress of the pinion shaft and slightly larger than those of the axial support portions at the two end portions of the sleeve, a large support strength can be maintained over the entire pinion shaft, and no problem occurs in the durability. In particular, in this arrangement, although the pinion shaft is supported at three apparent points, when the acting load is small, it is supported at two points in practice. Therefore, the valve action in travel along an almost straight road can be performed smoothly.

According to the first embodiment of the present invention, since the bearing gap of the axial support portion at the distal end portion of the pinion shaft is large and the degree of freedom in elasticity at the pinion teeth portion is large, when the pinion teeth mesh with the rack teeth, even if the gear precision is poor, this poor working precision can be absorbed. Since the rack teeth and the pinion teeth can mesh smoothly, a smooth steering feeling can be obtained. Since the meshing gap occurring due to the gear precision is not backlash among the constituent components, it does not cause knocking.

Since the axial support portion at the distal end portion of the pinion shaft functions only when a large load acts, which does not much influence the steering feeling, even if the pinion shaft is received not by a comparatively expensive needle bearing but directly by a bush or the steering body, the steering feeling does not suffer.

According to the second embodiment of the present invention, since the intermediate portion of the pinion shaft is axially supported by the steering body through the axial support portion having a bearing gap which is within the allowable bending stress of the pinion and slightly larger than those of the axial support portions at the two end portions of the pinion shaft, a large support strength can be maintained over the entire pinion shaft, and no problem occurs in the durability. In particular, in this arrangement, although the pinion shaft is supported at three apparent points, when the acting load is small, it is supported at two points in practice. Therefore, the valve action in travel along an almost straight road can be performed smoothly.

Since the axial support portion at the intermediate portion of the pinion shaft functions only when a large load acts, which does not much influence the steering feeling, even if the pinion shaft is received not by a comparatively expensive needle bearing but directly by a bush or the steering body, the steering feeling does not suffer.

What is claimed is:

1. A rack-pinion type power steering apparatus comprising:
   a cylindrical stub shaft which rotates in a steering body upon a steering operation;
   a torsion bar having one end fixed at one end of said stub shaft and extending through said stub shaft toward the other end of said stub shaft;
   a pinion shaft pivotally connected to the other end of said torsion bar, wherein a distal end portion of said pinion shaft is sized to loosely fit within an axial support portion of a distal end of said steering body;

a rotor arranged to cover said torsion bar from said stub shaft along an extending direction of said torsion bar; and a sleeve having one end integrally connected to said pinion shaft, extending from said pinion shaft along said stub shaft, and arranged around said rotor to constitute a rotary type channel selector valve between said rotor and said sleeve, wherein said pinion shaft is axially supported by said steering body at two end portions of said sleeve;

wherein said distal end portion of said pinion shaft away from said sleeve is axially supported by said steering body through the axial support portion having a bearing gap which is slightly larger than a bearing gap of either one of said axial support portions at said two end portions of said sleeve.

2. The apparatus according to claim 1, wherein said pinion shaft is axially supported by said steering body at the two end portions of the sleeve through a ball bearing and a bush.

3. The apparatus of claim 1, wherein said bearing gap is within an allowable bending stress of said pinion shaft.

4. The apparatus of claim 1, wherein said stub shaft is integrally connected to said torsion bar at a serrated portion.

5. The apparatus of claim 4, wherein said stub shaft is welded to said torsion bar.

6. A rack-pinion type power steering apparatus comprising: a cylindrical stub shaft which rotates in a steering body upon a steering operation;

a torsion bar fixed at one end of said stub shaft and extending through said stub shaft toward the other end of said stub shaft;

a pinion shaft pivotally connected to the other end of said torsion bar;

a rotor arranged to cover said torsion bar from said stub shaft along an extending direction of said torsion bar; and a sleeve having one end integrally connected to said pinion shaft, extending from said pinion shaft along said stub shaft, and arranged around said rotor to constitute a rotary type channel selector valve between said rotor and said sleeve, wherein said pinion shaft is axially supported by said steering body through axial support portions disposed at a distal end portion of said pinion shaft away from said sleeve and at an end portion of said sleeve away from said pinion shaft, and said pinion shaft has an intermediate portion which is axially supported by said steering body through an axial support portion having a bearing gap which is larger than those of said axial support portions.

7. An apparatus according to claim 3, wherein said intermediate portion of said pinion shaft is axially supported by said steering body through said axial support portion having a bearing gap which is within an allowable bending stress of said pinion shaft and slightly larger than a bearing gap of each of said other axial support portions.

8. The apparatus of claim 6, wherein said sleeve is integrally formed on said pinion shaft.

* * * * *